US012719785B2

(12) United States Patent
Mikkelson et al.

(10) Patent No.: US 12,719,785 B2
(45) Date of Patent: Aug. 25, 2026

(54) OUTPUT STATE SYNCHRONIZATION FOR BORDER GATEWAY PROTOCOL (BGP) PROCESSES

(71) Applicant: Arista Networks, Inc., Santa Clara, CA (US)

(72) Inventors: Joanne Mikkelson, Milpitas, CA (US); Jesper Skriver, Nicosia (CY); Isidoros Kouvelas, Athens (GR); Sharad Birmiwal, Burnaby (CA)

(73) Assignee: Arista Networks, Inc., Santa Clara, CA (US)

( * ) Notice: Subject to any disclaimer, the term of this patent is extended or adjusted under 35 U.S.C. 154(b) by 658 days.

(21) Appl. No.: 18/154,543

(22) Filed: Jan. 13, 2023

(65) Prior Publication Data

US 2024/0243998 A1 Jul. 18, 2024

(51) Int. Cl.
*H04L 45/00* (2022.01)
*H04L 45/02* (2022.01)

(52) U.S. Cl.
CPC .............. *H04L 45/54* (2013.01); *H04L 45/04* (2013.01)

(58) Field of Classification Search
None
See application file for complete search history.

(56) References Cited

U.S. PATENT DOCUMENTS 6,910,148 B1 * 6/2005 Ho .......................... H04L 45/56 714/4.4
7,230,914 B2 6/2007 Sankar et al.
7,286,468 B2 10/2007 Scudder et al.
7,417,947 B1 8/2008 Marques et al.
7,506,194 B2 * 3/2009 Appanna .............. H04L 45/586 714/3
7,609,617 B2 10/2009 Appanna et al.
7,716,367 B1 * 5/2010 Leighton ............ H04L 61/4511 709/244
7,751,311 B2 7/2010 Ramaiah et al.
(Continued)

FOREIGN PATENT DOCUMENTS

EP 2680515 B1 3/2017

OTHER PUBLICATIONS

Walfish M., Vutukuru M., Balakrishnan H., Karger D., Shenker S. “Ddos Defense By Offense” pp. 303-314. Cited from “https://dl.acm.org/doi/pdf/10.1145/1159913.1159948” online. (Year: 2006).*

*Primary Examiner* — Xavier S Wong
(74) *Attorney, Agent, or Firm* — Treyz Law Group; Jason Tsai

(57) ABSTRACT

A networking system may facilitate Border Gateway Protocol (BGP) switchover between an active BGP process and a standby BGP process. A method is provided that includes using the active BGP process to establish a communication session with a peer, to add the peer to an outbound update group listing one or more peers sharing the same outbound policy, and to add a dummy peer corresponding to the peer to the outbound update group in response to receiving a synchronization request from the standby BGP process. The active BGP process can advertise a collection of routes to the standby BGP process in accordance with the dummy peer being listed in the outbound update group. The active BGP process can then perform outbound BGP message hairpinning operations with the standby BGP process.

13 Claims, 9 Drawing Sheets

(56) References Cited

U.S. PATENT DOCUMENTS

| | | | |
|---|---|---|---|
| 7,787,365 | B1 | 8/2010 | Marques et al. |
| 7,801,135 | B2 | 9/2010 | Appanna et al. |
| 7,940,650 | B1 | 5/2011 | Sandhir et al. |
| 7,948,873 | B2 * | 5/2011 | Ward ...................... H04L 45/04 370/219 |
| 8,005,980 | B2 | 8/2011 | Harvey et al. |
| 8,254,396 | B2 | 8/2012 | Appanna et al. |
| 8,537,660 | B2 | 9/2013 | Ramaiah et al. |
| 8,769,155 | B2 | 7/2014 | Nagappan et al. |
| 8,780,699 | B1 * | 7/2014 | Hasan ............... H04L 12/40182 709/224 |
| 9,106,525 | B2 | 8/2015 | Ramaiah et al. |
| 9,166,904 | B2 | 10/2015 | Appanna |
| 9,356,859 | B2 | 5/2016 | Hanif et al. |
| 9,491,107 | B1 | 11/2016 | Scudder et al. |
| 2004/0008700 | A1 * | 1/2004 | Visser ..................... H04L 45/00 370/401 |
| 2006/0062142 | A1 * | 3/2006 | Appanna ................. H04L 69/40 370/242 |
| 2006/0164995 | A1 * | 7/2006 | Djernaes ............... H04L 45/306 370/238 |
| 2007/0064698 | A1 * | 3/2007 | Appanna ................. H04L 45/04 370/392 |
| 2010/0265956 | A1 | 10/2010 | Li |
| 2012/0140616 | A1 | 6/2012 | Zhou et al. |
| 2023/0095362 | A1 * | 3/2023 | Xu .......................... H04L 45/58 370/216 |

* cited by examiner

OUTPUT STATE SYNCHRONIZATION FOR BORDER GATEWAY PROTOCOL (BGP) PROCESSES

BACKGROUND

A communication system can include multiple network devices that are interconnected to form a network for conveying packets from a source device to a destination device. Routing information indicating the route through which the packets are to be conveyed from the source device to the destination device can be shared amongst one or more peer network devices using Border Gateway Protocol (BGP) established over corresponding Transmission Control Protocol (TCP) sessions between pairs of peer network devices.

Each network device can run a BGP process to maintain an inbound routing table or an outbound routing table and to convey routing information such as network layer reachability information (NLRI) to facilitate the use of BGP amongst its peer network devices.

DETAILED DESCRIPTION

Figure 1:
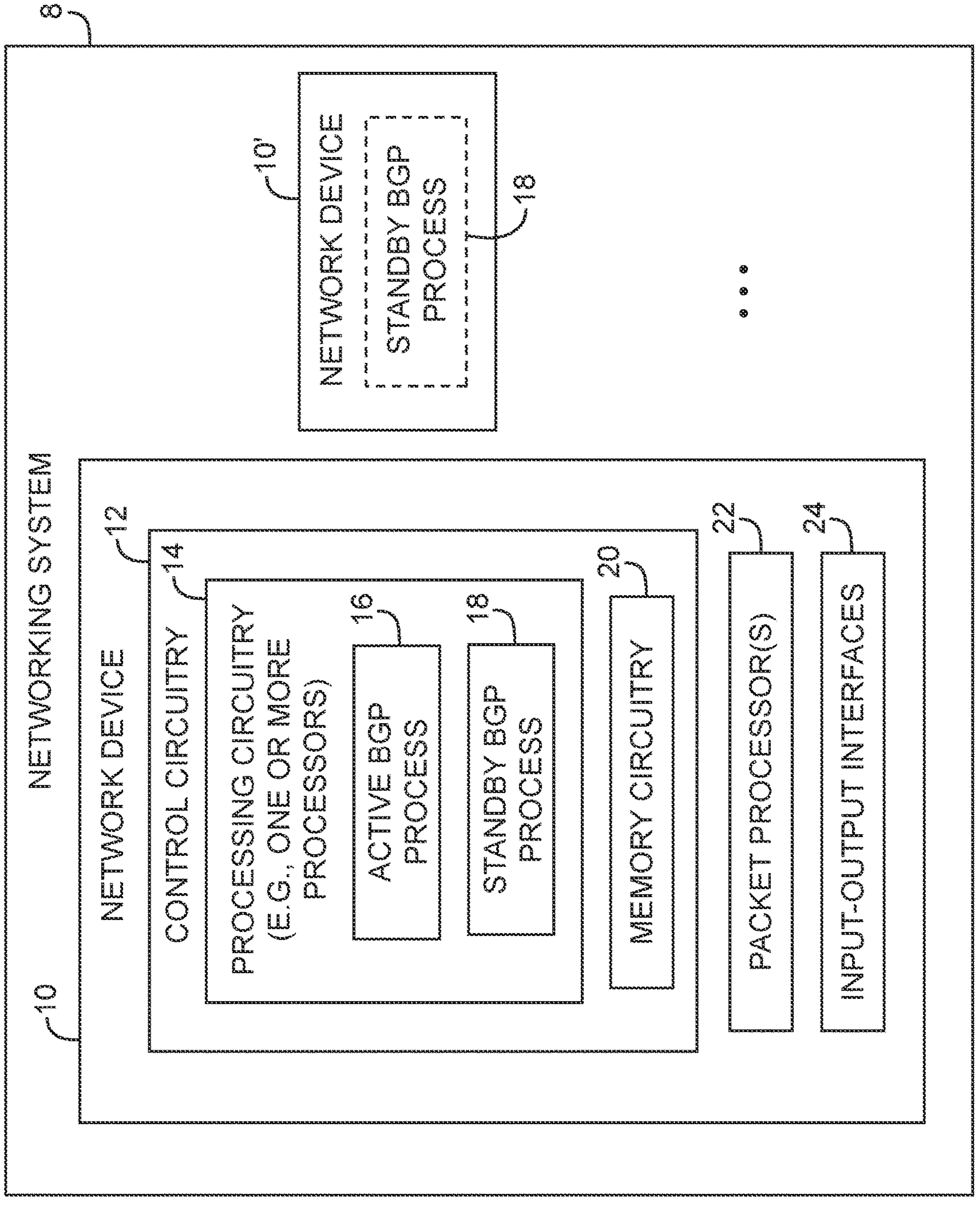
FIG. 1 is a diagram of an illustrative networking system configured to run an active Border Gateway Protocol (BGP) process and a standby BGP process in accordance with some embodiments.

Network devices such as routers (e.g., multi-layer L2/L3 switches) may use Border Gateway Protocol (BGP) to exchange routing information. As an example, a network device may exchange routing information using BGP with one or more peer network devices over corresponding Transport Control Protocol (TCP) sessions. Each of these network devices may execute or run a BGP process that facilitates the reception of routing information such as network layer reachability information (NRLI) in BGP update messages from one or more peer network devices, the processing of the received routing information to determine a best routing path, and/or the transmission of routing information in BGP update messages to one or more peer network devices. Neighboring BGP devices are sometimes referred to as peers or BGP peers.

In practice, a network device, or more specifically, the BGP process running on the network device can experience downtime or failure events that disrupt the exchange of routing information and the network device's role as a peer to other devices in the network. It may therefore be desirable to provide BGP switchover or failover functionalities such that the network device can resolve or bypass any such failure events and to do so in a manner such that its peers are unaware that the network device and/or BGP process executed thereon are experiencing downtime or failure to help avoid any disruption.

Providing BGP failover/switchover functionalities or generally preparing the network device to resolve any failure events may consume processing resources at the network device (e.g., processing resources more desirably reserved for normal BGP processing such as path selection or other control plane functions of the network device). As such, it may further be desirable to reduce or minimize resource expenditure at the network device and/or the BGP process when preparing to resolve any failure events when providing the BGP failover functionalities.

Accordingly, a networking system may execute (run) a standby BGP process with which an active BGP process on the network device can perform a switchover operation in response to the downtime or failure event affecting the active BGP process. The standby BGP process may become the active (primary) BGP process after a switchover operation. The standby BGP process may be executed concurrently with the active BGP process using similar or identical state information received by the active BGP process. In other words, state information may be synchronized between the active and standby BGP processes. In some embodiments, conveying edge state information instead of internal state information from the active BGP process to the standby BGP process can help preserve significant processing resources. In contrast to internal state information, "edge" state information may generally refer to routing information that traverses an edge of a BGP process (e.g., inbound routing information received at a BGP process and outbound routing information output from a BGP process).

An illustrative networking system configured to provide BGP process switchover functionalities in a manner that minimizes disruption of a BGP process for a network device and efficiently utilizes processing resources at the network device in preparation for the BGP process switchover is shown in FIG. 1. As shown in FIG. 1, networking system 8 may include one or more network devices. Each network device in system 8 may be a switch (e.g., a multi-layer L2/L3 switch), a router or gateway, a bridge, a hub, a repeater, a firewall, a wireless access point, a device serving other networking functions, a device that includes a combination of these functions, or other types of network devices. Multiple such network devices having the same or different networking functions in system 8 may be present and interconnected to form a communications network that forwards traffic (e.g., data packets) between end hosts.

The communications network may be implemented with any suitable scope (e.g., as a wide area network, including one or more campus area networks or including one or more local area networks, etc.). If desired, the communications network may include internet service provider networks (e.g., the Internet) or other public service provider networks, private service provider networks (e.g., multiprotocol label switching (MPLS) networks), and/or may include other types of networks such as telecommunication service provider networks (e.g., a long-term evolution (LTE) network).

An illustrative network device of networking system 8 is network device 10. Configurations in which network device 10 is a router, a switch having L3 (layer 3 or network layer) processing functionalities (e.g., a multi-layer switch), or any other electronic device with network routing functionalities are sometimes described herein as an example.

As shown in FIG. 1, network device 10 may include control circuitry 12, one or more packet processor(s) 22, and input-output interfaces 24 disposed within a housing of network device 10. Control circuitry 12 may include processing circuitry 14 and memory circuitry 20. The housing of network device 10 may include an exterior cover (e.g., a plastic exterior shell, a metal exterior shell, or an exterior shell formed from other rigid or semi-rigid materials) that provides structural support and protection for the components of network device 10 mounted within the housing.

Processing circuitry 14 may include one or more processors or processing units based on central processing units (CPUs), graphics processing units (GPUs), microprocessors, general-purpose processors, host processors, microcontrollers, digital signal processors, programmable logic devices such as a field programmable gate array device (FPGA), application specific system processors (ASSPs), application specific integrated circuit (ASIC) processors, and/or other types of processors. Processing circuitry 14 may run (execute) a network device operating system and/or other software/firmware that is stored on memory circuitry 20.

Memory circuitry 20 may include non-transitory (tangible) computer readable storage media that stores the operating system software and/or any other software code, sometimes referred to as program instructions, software, data, instructions, or code. As an example, the operations described herein for facilitating the BGP switchover as well as other network device control plane functions may be stored as (software) instructions on the non-transitory computer-readable storage media (e.g., in portion(s) of memory circuitry 20 in network device 10). The corresponding processing circuitry (e.g., one or more processors of processing circuitry 14 in network device 10) may process or execute the respective instructions to perform the corresponding operations (e.g., for facilitating the BGP switchover). Memory circuitry 20 may be implemented using non-volatile memory (e.g., flash memory or other electrically-programmable read-only memory configured to form a solid-state drive), volatile memory (e.g., static or dynamic random-access memory), hard disk drive storage, and/or other storage circuitry. Processing circuitry 14 and memory circuitry 20 as described above may sometimes be referred to collectively as control circuitry 12 (e.g., implementing a control plane of network device 10).

In particular, processing circuitry 14 may execute network device control plane software such as operating system software, routing policy management software, routing protocol agents or processes (e.g., one or more BGP processes such as an active BGP process 16 and optionally a standby BGP process 18), routing information base (RIB) agents, and other control software, may be used to support the operation of protocol clients and/or servers, may be used to support the operation of packet processor(s) 22, may store packet forwarding information, may execute packet processing software, and/or may execute other software instructions that control the functions of network device 10 and the other components therein. While processing circuitry 14 is primarily described herein as executing one or more BGP processes, processing circuitry 14 may also execute one or more other network routing protocol agents or processes. As examples, these other network protocol agents may implement non-BGP distance vector routing protocols, Enhanced Interior Gateway Routing Protocol (EIGRP), Exterior Gateway Protocol (EGP), Routing Information Protocol (RIP), Open Shortest Path First (OSPF) protocol, Label Distribution Protocol (LDP), Multiprotocol Label Switching (MPLS), Immediate system-to-immediate system (IS-IS) protocol, or other Internet routing protocols (just to name a few).

Packet processor(s) 22 may be used to implement a data plane or forwarding plane of network device 10. Packet processor(s) 22 may include one or more processors or processing units based on central processing units (CPUs), graphics processing units (GPUs), microprocessors, general-purpose processors, host processors, microcontrollers, digital signal processors, programmable logic devices such as a field programmable gate array device (FPGA), application specific system processors (ASSPs), application specific integrated circuit (ASIC) processors, and/or other processor architectures.

Packet processor 22 may receive incoming data packets via input-output interfaces 24 (e.g., ports), parse and analyze the received data packets, process the packets based on packet forwarding decision data (e.g., in a forwarding information base) and/or in accordance with a network protocol, and forward (or drop) the data packet accordingly. The packet forwarding decision data may be stored on a portion of memory circuitry 20 and/or other memory circuitry integrated as part of or separate from packet processor 16.

Input-output interfaces 24 may include communication interface components such as one or more Bluetooth interface, Wi-Fi interface, Ethernet interface, optical interface, and/or other network interfaces for connecting network device 10 to the Internet, a local area network, a wide area network, a mobile network, other types of networks, and/or to another network device, peripheral devices, and/or other electronic equipment. Network device 10 may also include other components such as a system bus or connector(s) that couple the components of network device 10 to one another, power management components, thermal management components, etc.

In the example of FIG. 1, processing circuitry 14 may execute (run) a BGP process such as active BGP process 16 to exchange network routing information and network device capabilities with other network devices (sometimes referred to herein as peer network devices or "peers" of network device 10). Active BGP process 16 can sometimes be referred to as the primary BGP process. In particular, network device 10 may establish a TCP session with each peer and may exchange BGP messages over each of these TCP sessions with a corresponding network device. Use of TCP sessions to link together multiple peers in a BGP network is merely illustrative. If desired, other types of network communication links, sessions, or paths can be employed. The exchanged network routing information may be used to generate or otherwise inform the packet forwarding decision data and therefore the packet forwarding behavior of packet processor 22, among other functions.

Network device 10 and the components therein such as control circuitry 12 can experience unplanned downtime or failure events, which can disrupt the execution of active BGP process 16. Accordingly, a separate BGP process such as a standby BGP process 18 may also run on processing circuitry 14 in device 10 or elsewhere in networking system 8 such as at network device 10' (e.g., on processing circuitry of network device 10' executing on software instructions for a standby BGP process stored on the memory circuitry of network device 10'). In an illustrative configuration described herein as an example, network device 10' may have at least the same components and functionalities as described for network device 10 (e.g., device 10' be another instance of network device 10). If desired, network device 10' may omit some of the components and functionalities of network device 10 and/or may include additional components or functionalities than those described for network device 10.

In general, active BGP process 16 and standby BGP process 18 may be executed on the same processor or on any combination of different processors. As examples, active and standby BGP processes 16 and 18 can be executed on the same processor in processing circuitry 14, can be executed on two different processors in processing circuitry 14 in the same network device 10, or can be executed on respective processors of two different network devices 10 and 10' (e.g., in configurations where network devices 10 and 10' are housed in the same housing and/or mounted to the same chassis to implement active and standby supervisors on the same modular system having multiple line cards). If desired, the active BGP process may be executed on a processor on local equipment (e.g., on network device 10), whereas the standby BGP process may be executed on computing resources on remote server equipment.

Figure 2:
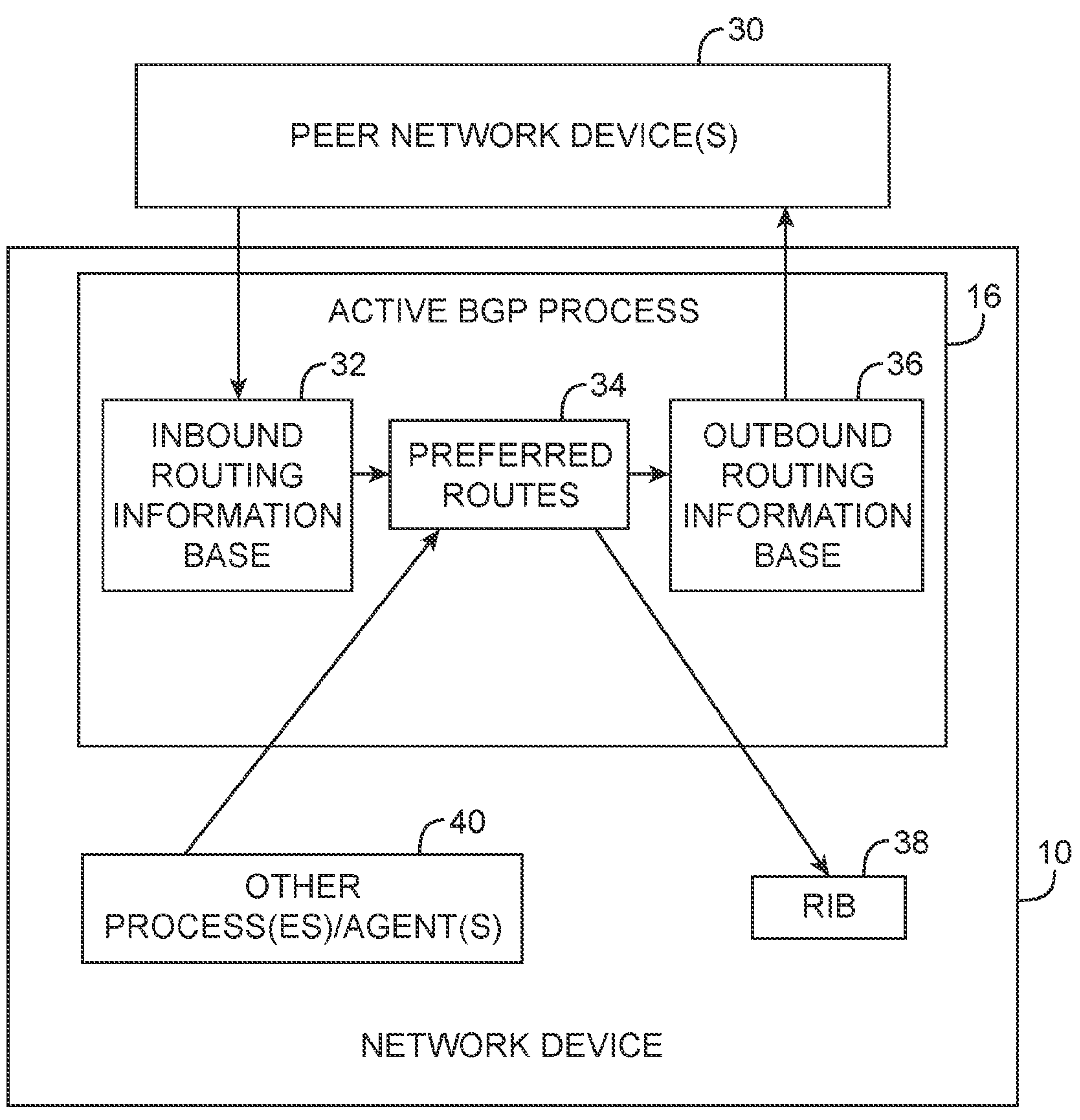
FIG. 2 is a diagram of an illustrative network device configured to communicate with one or more BGP peer network devices in accordance with some embodiments.

FIG. 2 is a diagram of an illustrative BGP process such as active BGP process 16 running on network device 10. Active BGP process 16 may exchange network routing information (e.g., network layer reachability information (NLRI) and attributes) with one or more peer network devices 30 on which respective BGP processes can run. Network device 10 running active BGP process 16 and peer network device(s) 30 may communicate via BGP connections established over corresponding TCP sessions.

In particular, active BGP process 16 may receive routing information such as NLRIs and attributes from each peer network device 30 over a corresponding TCP session with that peer network device 30. The received routing information may be stored at inbound routing information base (RIB) 32 (sometimes referred to as incoming routing information base 32 or incoming RIB received from a neighboring or adjacent peer, and is thus sometimes referred to as "Adj-RIB-In"). Active BGP process 16 may maintain the incoming routing information (e.g., a collection of routes) at inbound RIB 32 by storing not yet processed routing information received from peer network devices 30. Active BGP process 16 may, among other functions, perform a route selection operation (sometimes referred to as a best path algorithm) by processing the received routing information stored at inbound RIB 32, along with other inputs from other processes/agents 40, to determine a set of preferred routes 34. Active BGP process 16 may maintain a local RIB (e.g., local to active BGP process 16) to store the set of determined preferred routes.

As part of performing route selection, active BGP process 16 may use at least two routes (sometimes referred to as paths) including one or more received advertised routes stored at inbound RIB 32 and/or one or more preferred routes stored at the local RIB to the same destination. Active BGP process 16 may compare the different paths sharing the same destination to arrive at a preferred path to that destination. This comparison may be based on a comparison of different attributes or parameters associated with the paths being compared. As examples, the compared attributes or parameters, in order of comparison, may be the local weight of each path (e.g., with higher weights preferred), the local preference for each path, whether a path originated locally via an aggregate or a network, the shortest AS_PATH (autonomous system path), origin type of each path (e.g., Exterior Gateway Protocol (EGP) preferred over Interior Gateway Protocol (IGP)), multi exit discriminator (MED) for each path (e.g., with lower MED preferred), whether each path is external BGP or internal BGP (e.g., external BGP preferred over internal BGP), IGP metric of each path (e.g., with lower IGP metric to the BGP next hop preferred), order of paths received (e.g., first received path preferred), router ID of BGP peer network device from which each path is received (e.g., with lower router ID preferred), cluster list of each path (e.g., with lower length of cluster list preferred), and neighbor address of each path (e.g., with lower neighbor address preferred). The new preferred path may then be stored at the local RIB as the preferred route for the destination.

One or more stored preferred routes at the local RIB may be installed or stored at the routing information base (RIB) 38 for network device 10. RIB 38 (sometimes referred to as main RIB 38 or network device RIB 38) may include routes based on which packet forwarding decision data is generated (e.g., for use by packet processor(s) 22 in FIG. 1). Depending on the configuration of network device 10, the BGP preferred route may not always be installed on RIB 38 (e.g., routes from other protocol agents and/or static routes may instead be installed on RIB 38 for any particular destination).

One or more stored preferred routes at the local RIB may further be conveyed to and installed or stored on outbound RIB 36 (sometimes referred to as outgoing RIB 36 or outgoing RIB that is sent to a neighboring or adjacent peer, and is thus sometimes referred to as "Adj-RIB-Out") for advertising to peer devices routing information (e.g., NLRIs and attributes). Active BGP process 16 may maintain the outgoing routing information (e.g., a collection of routes) at outbound RIB 36 by storing not yet advertised routing information. Active BGP process 16 may convey the routing information for advertisement to each peer network device 30 over a corresponding TCP session with that peer network device 30. The set of peer network devices 30 from which advertised routing information is received may be the same or may be different from the set of peer network devices 30 to which advertised routing information is transmitted.

While inbound RIB 32, the local RIB storing preferred routes 34, outbound RIB 36, and main RIB 38 are sometimes shown or referred to herein as separate data structures for storing routing information, the different RIBs may (if desired) be implemented on a shared data storage structure and/or across any combination of data storage components (e.g., on memory circuitry 20 in FIG. 1). Configurations in which inbound RIB 32, the local RIB storing preferred routes 34, and outbound RIB 36 are stored on a shared data storage circuit on memory circuitry 20, while main RIB 38 is stored on a separate data storage circuit on memory circuitry 20 are sometimes described herein as an illustrative example.

Figure 3:
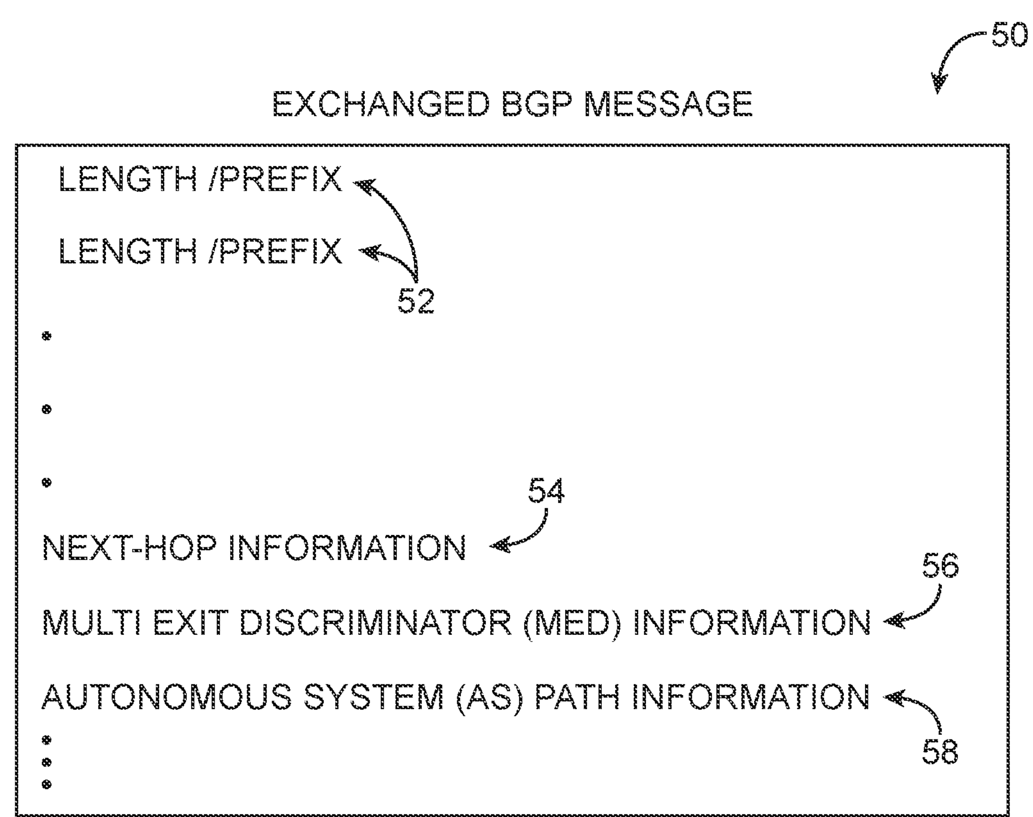
FIG. 3 is a diagram of an illustrative BGP message in accordance with some embodiments.

FIG. 3 is a diagram of an illustrative BGP message such as a BGP update message that can be received by network device 10 from a peer network device 30 and/or sent to a peer network device 30 by network device 10. In particular, BGP (update) message 50 may include NLRI 52 that includes one or more paths (routes) defined by corresponding sets of a length and a network prefix (e.g., 2-tuples) that are reachable by the transmitting peer network device. In particular, the length may represent a network mask (e.g., in Classless Inter-Domain Routing notation such as /8, /16, /23, /24, /25, etc.) and the prefix may represent the network address for the subnet. Each pair of a length and a network prefix defines a path or route and may sometimes be referred to herein as a path or route.

Additionally, BGP message 50 may include attributes for the paths such as next-hop information 54 (e.g., information indicative of the IP address of the border router that should be used as the next hop to the destination of the routes listed in NLRI 52), multi exit discriminator (MED) information 56 (e.g., information used to discriminate between multiple exit points to a neighboring autonomous system), autonomous system (AS) path information 58 such as a sequence of AS path segments, and/or any other desired set of paths attributes for advertisement amongst peer BGP network devices (e.g., origin information indicative of the origin of the path information, local preference information indicative of the degree of preference for an advertised route, etc.). While not explicitly illustrated in the example of FIG. 3, BGP update message 50 may also include information indicative of withdrawn routes (e.g., destinations that have become unreachable and are being withdrawn from service).

As an example, active BGP process 16 (FIG. 2) in receipt of BGP message 50 may first store the received NLRI and path attributes advertised by a peer network device 30 in inbound RIB 32. During processing, active BGP process 16 may use one or more of the path attributes (e.g., attribute information 54, 56, and 56 and/or other path attributes) from the received NLRI 52 to select a preferred route. A route (or multiple routes, if specified) in NLRI 52 may be installed as a preferred route for a specific destination on the local RIB of active BGP process 16. The route may optionally be installed in main RIB 38 of network device 10 (FIG. 2) and/or may optionally be installed in outbound RIB 36 for advertising to other peer network devices 30.

In accordance with some embodiments, it may be beneficial to operate the standby BGP process such that it can handle a switchover on short notice and without behaving disruptively in a way that is noticeable to peer BGP devices. A seamless switchover from an active BGP process to a standby BGP process may require synchronization of states between the active and standby BGP processes. In particular, the embodiments described herein relate to synchronizing output state information such as routing information in the outbound RIBS.

Figure 4:
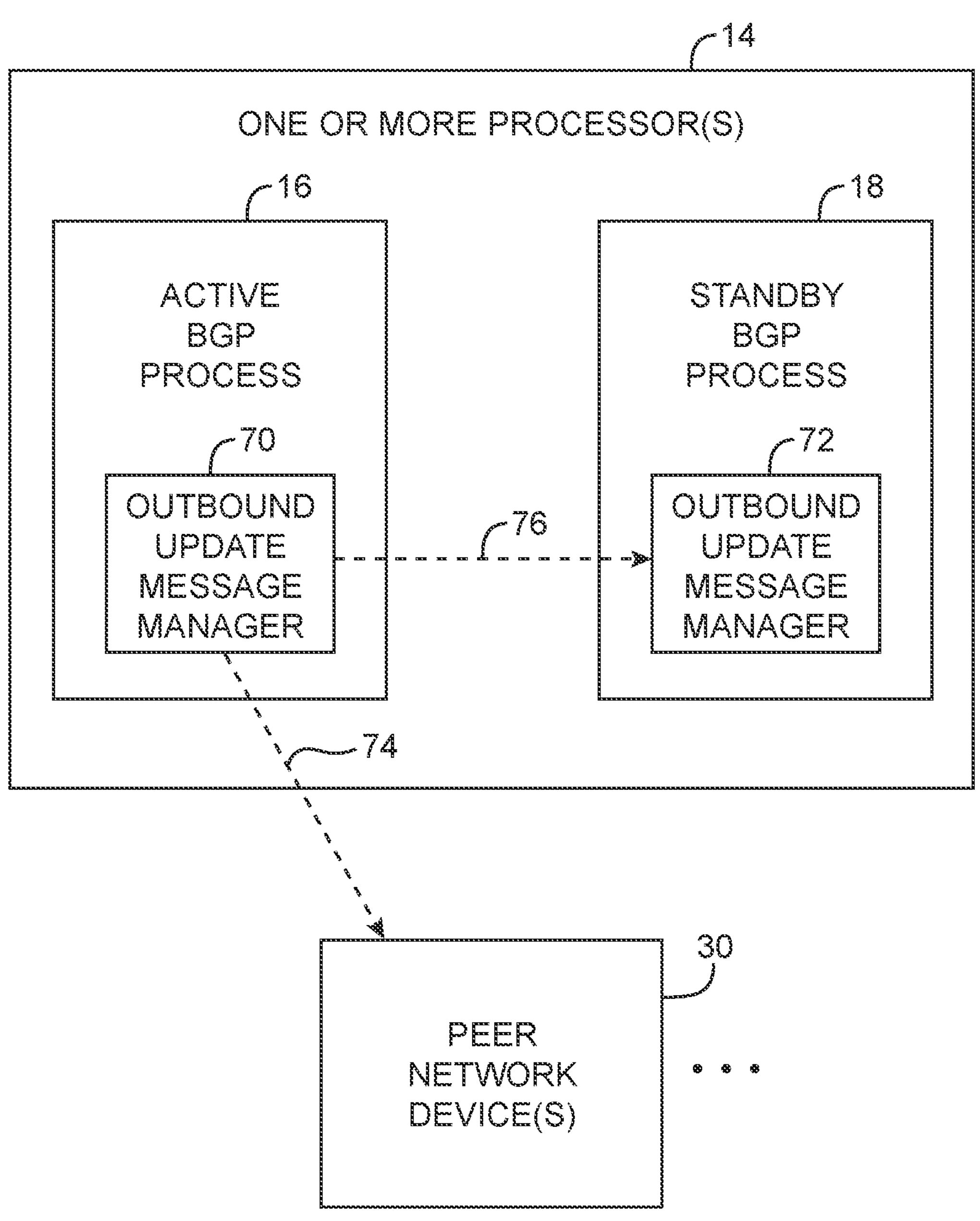
FIG. 4 is a diagram showing how an outbound update message manager in an active BGP process can be initially synchronized with an outbound update message manager in a standby BGP process in accordance with some embodiments.

FIG. 4 is a diagram showing how an active BGP process and a standby BGP process can be synchronized using respective outbound update message managers. As shown in FIG. 4, active BGP process 16, which can be implemented on one or more processor(s) 14, may include an outbound update message manager 70. Outbound update message manager 70 may be configured to manage the sending of BGP update messages in accordance with an outbound RIB and an outbound update group for active BGP process 16. Outbound update message manager 70 running as part of active BGP process 16 is sometimes referred to and defined herein as an active outbound update message manager.

On the other hand, standby BGP process 18, which can be implemented on one or more processor(s) 14 (e.g., on the same processor or on a different processor than the active BGP process), may include another outbound update message manager 72. Outbound update message manager 72 may be configured to manage the sending of BGP update messages in accordance with an outbound RIB and an outbound update group for BGP process 18 when or if it later becomes an active BGP process following a switchover event. Outbound update message manager 72 running as part of standby BGP process 18 is sometimes referred to and defined herein as a standby outbound update message manager.

Figure 5:
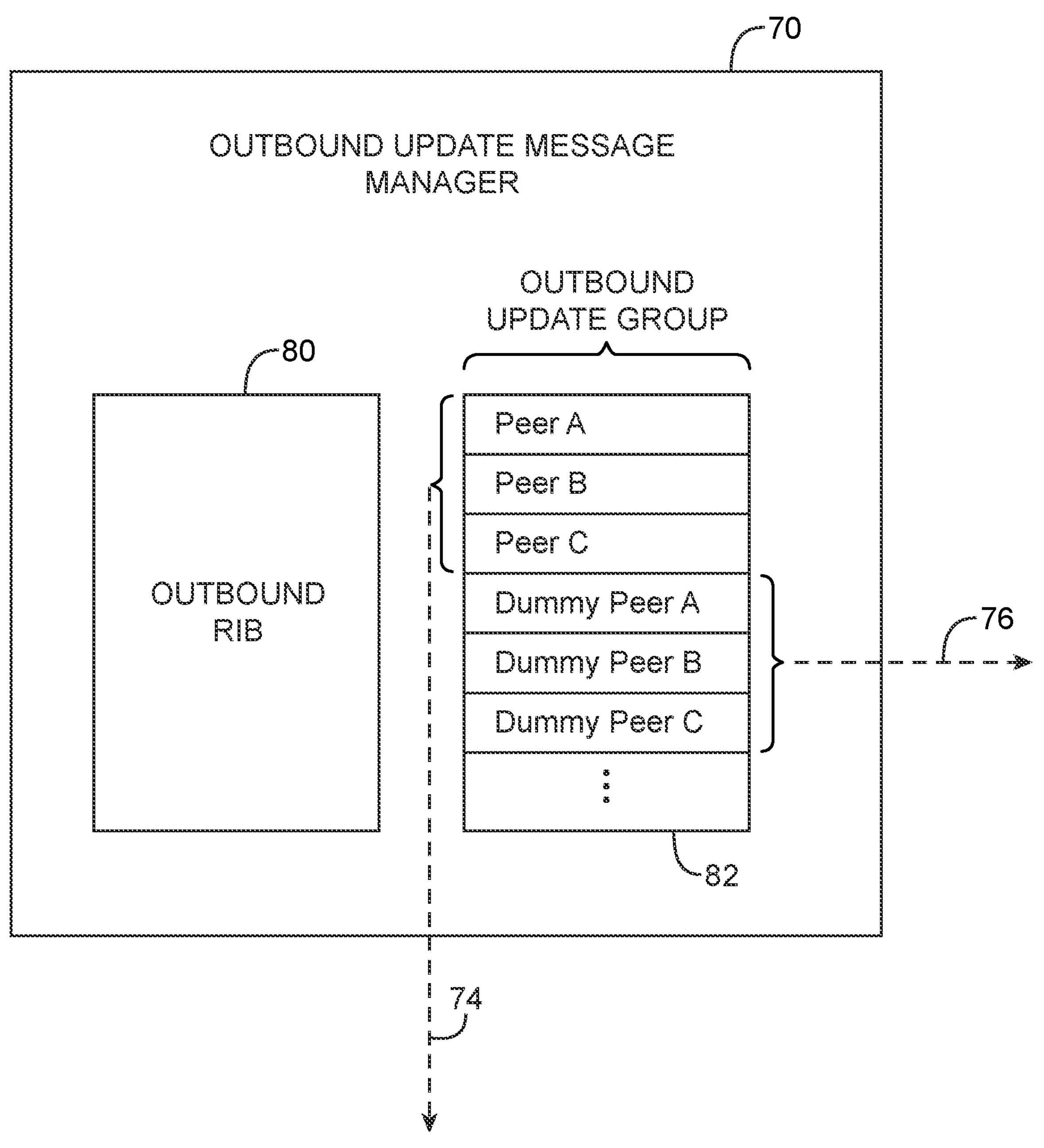
FIG. 5 is a diagram of an illustrative outbound update message manager of an active BGP process in accordance with some embodiments.
Figure 9:
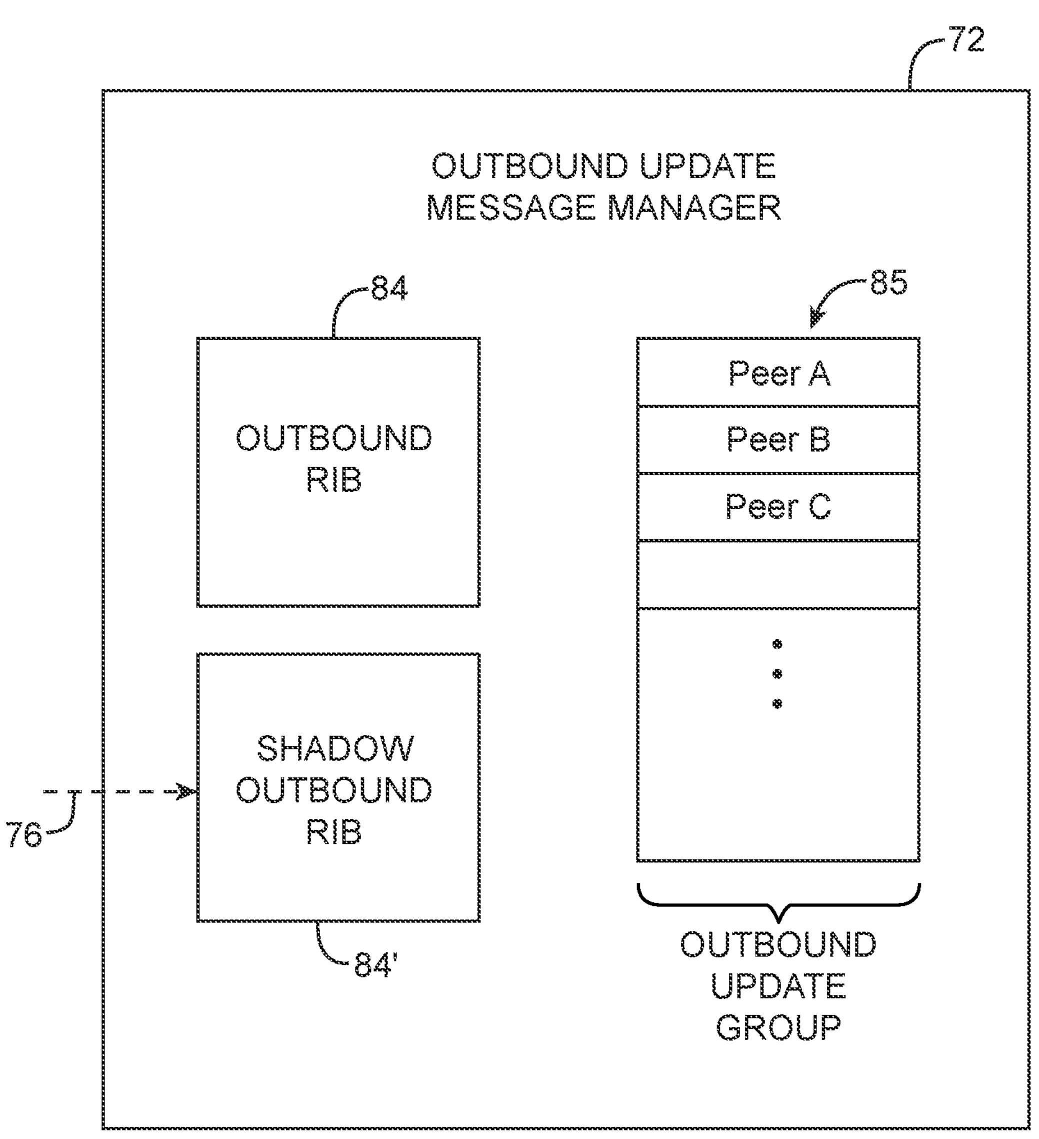
FIG. 9 is a diagram of an illustrative outbound update message manager of a standby BGP process in accordance with some embodiments.

FIG. 5 is a diagram of an illustrative outbound update message manager such as outbound update message manager 70. As shown in FIG. 5, outbound update message manager 70 can be used to manage an outbound RIB 80 and a corresponding outbound update group 82. Outbound RIB 80 can refer to or be defined herein as a collection of routes that are advertised to peer devices in the associated outbound update group 82. Outbound RIB 80 can sometimes be referred to as Adj-RIB-Out. The collection (table) of routes may be advertised in the form of BGP update messages (see, e.g., FIG. 3). Outbound update group 82 can refer to or be defined herein as a collection of peers all sharing the same (common) outbound policy. If desired, outbound update message manager 70 can also include one or more additional outbound update groups that adhere to different outbound policies. Outbound update message manager 72 of the standby BGP process 18 can have a similar data structure as manager 70 (see, e.g., FIG. 9). As shown in FIG. 9, outbound update message manager 72 may be configured to manage the sending of BGP update messages in accordance with an outbound RIB 84 and an outbound update group 85 for BGP process 18 when or if it later becomes an active BGP process following a switchover event. Outbound RIB 84 is sometimes referred to herein as the standby outbound RIB or standby Adj-RIB-Out.

An active BGP process may be in communication with one or more peers. In the example of FIG. 5, the active BGP process may be concurrently communicating with multiple peers such as a first peer A, a second peer B, and a third peer C. This is merely illustrative. Here, active outbound update message manager 70 may be configured to advertise routes listed in outbound RIB 80 to the peers A, B, and C, as shown by the information flow indicated by arrows 74 in FIGS. 4 and 5.

To ensure a seamless switchover from the active BGP process to the standby BGP process, the standby BGP process should be synchronized with the active BGP process. The standby BGP process, however, may not yet be ready or may not yet exist at the point in time when the active BGP process establishes its TCP session with its peer(s). For example, the active BGP process may have already communicated one or more BGP update messages to peers A and B over respective TCP sessions even before the standby BGP process is created. In such scenarios, any network layer reachability and attribute information that is sent by the active BGP process to the peer prior to the standby BGP process being live or ready must be communicated to the standby BGP process when the standby BGP process becomes live or ready.

Figure 6:
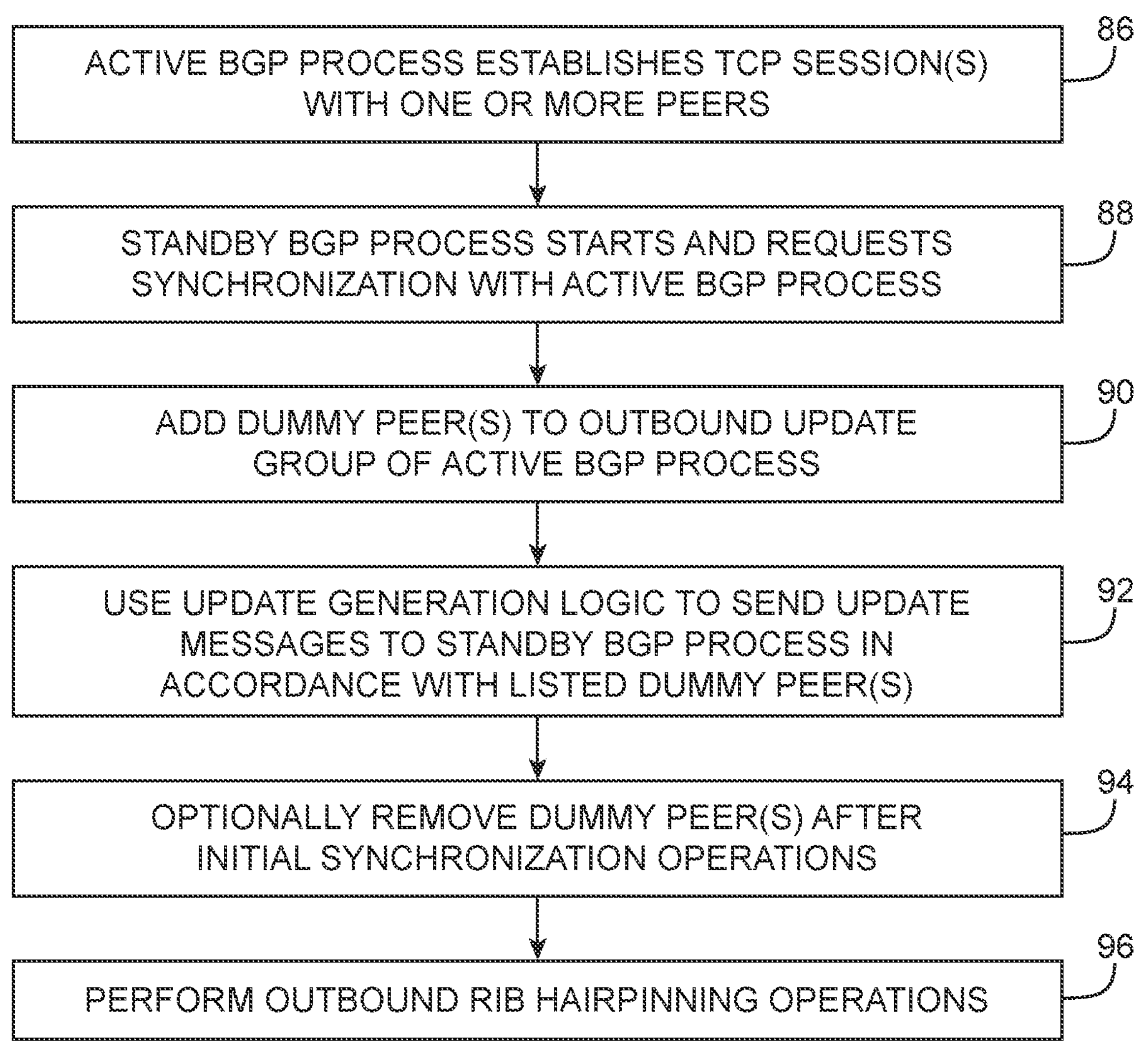
FIG. 6 is a flow chart of illustrative steps for performing output state synchronization between active and standby BGP processes in accordance with some embodiments.

FIG. 6 is a flow chart of illustrative steps for performing output state synchronization between active and standby BGP processes to ensure proper synchronization even when the standby BGP process is started much later than the primary communications between the active BGP process and its peers. During the operations of block 86, an active BGP process such as active BGP process 16 running on one or more processors may establish TCP session(s) with one or more peer network devices. During block 86, active BGP process 16 can send one or more BGP update messages to its peers. For instance, if the active BGP process has established TCP sessions with peers A, B and C, outbound update group 82 will list peer A, peer B, and peer C, which would direct active outbound update message manager 70 to advertise the information in outbound RIB 80 to peers A, B, and C.

During the operations of block 88, a standby BGP process such as standby BGP process 18 can start running or be instantiated. Once standby BGP process 18 is started, standby BGP process 18 can output a request asking to be synchronized with active BGP process 16. The example of FIG. 6 in which block 88 occurs after block 86 is merely illustrative and is not intended to limit the scope of the present embodiment. In some embodiments, the operations of block 88 might precede block 86 (e.g., standby BGP process 18 is already present when active BGP process 16 establishes a connection with a peer). In such scenarios, blocks 90, 92, and 94 can be bypassed and processing can proceed directly to block 96.

During the operations of block 90 (e.g., after receiving the synchronization request from the standby BGP process), outbound update message manager 70 in the active BGP process can add one or more dummy peers to outbound update group 82. At this time, if outbound update group 82 already includes peer A, peer B, and peer C, outbound update message manager 70 can update outbound update group 82 to add a first dummy peer A mirroring actual peer A, a second dummy peer B mirroring actual peer B, and a third dummy peer C mirroring actual peer C.

In another scenario, if outbound update group 82 only includes peer A and peer B, outbound update message manager 70 can update outbound update group 82 to add a first dummy peer A mirroring actual peer A and a second dummy peer B mirroring actual peer B. If active BGP process 16 establishes a connection with a new peer (e.g., peer D) after standby BGP process 18 is started, then outbound update message manager 70 can update outbound update group 82 to simultaneously add peer D while adding dummy peer D that mirrors actual peer D. The dummy peers in outbound update group 82 are sometimes referred to as "mirror," "shadow," or "synchronization" peers since outbound update message manager 70 will be used to relay the same information in outbound RIB 80 that was previously advertised to the actual (real) peers to also the standby BGP process.

During the operations of block 92, active BGP process 16 can leverage existing BGP update generation logic to transmit the past network layer reachability and attribute information to the standby BGP process 18 based on the dummy peer(s) listed in outbound update group 82 (see, e.g., information flow indicated by arrows 76 in FIGS. 4 and 5). The standby BGP process 18 can leverage existing parsing logic to decode messages or other information received from active BGP process 16 during synchronization operations. If desired, the output state information being sent from the active BGP process to the standby BGP process during this initial synchronization need not be packaged in the form of BGP messages but can be encoded in other forms of data transport.

In the example of FIG. 5, outbound update message manager 70 may now resend the information in outbound RIB 80 to the standby BGP process for the three peers in accordance with the list of dummy peers listed in the outbound update message group. In other words, creation of a dummy peer in the outbound update group ensures that past NLRI and attribute information be synchronized with the newly instantiated standby BGP process. Outbound update message manager 72 in standby BGP process 18 can maintain or update a shadow outbound RIB 84' (see, e.g., FIG. 9) based on the information being advertised or shared from active BGP process 16. The operations of block 92 can thus ensure that shadow outbound RIB 84' in the standby outbound update message manager 72 is identical to the outbound RIB 80 of the active outbound update message manger 70. Outbound update message manger 72 may maintain or update its own (local) outbound RIB 84 based on its own internal input state information by computing best paths. Thus, the contents of the local outbound RIB 84 and the shadow outbound RIB 84' can differ. Later, when the BGP switchover eventually occurs, operations can be performed to reconcile any differences between the contents of outbound RIBs 84 and 84'. If the contents are identical, then no reconciliation is needed. If the contents are mismatched, then outbound update message manager 72 can simply use the local outbound RIB 84 (and ignore the shadow outbound RIB 84').

During the operations of block 94, a dummy peer can optionally be removed after the initial output state synchronization operations described in connection with block 92 are complete. For example, when the output states corresponding to dummy peer A have been advertised to the standby BGP process, dummy peer A can be removed or deleted from outbound update group 82. As another example, when the output states corresponding to dummy peer B have been advertised or shared with the standby BGP process, dummy peer B can be removed or deleted from outbound update group 82. As another example, when the output states corresponding to dummy peer C have been advertised or shared with the standby BGP process, dummy peer C can be removed or deleted from outbound update group 82. The operations of blocks 86-94 are sometimes referred to collectively herein as initial synchronization operations between the active and standby BGP processes.

During the operations of block 96, active BGP process 16 may be configured to perform outbound RIB hairpinning operations with standby BGP process 18. Outbound RIB hairpinning operations can be performed to ensure ongoing synchronization between the active and standby BGP processes after the initial synchronization operations described in connection with blocks 86-94. As routing information in outbound RIB 80 of the active BGP process is constantly being updated (e.g., due to churn as route updates are received from peers, as new routes are added, or as existing routes are being deleted or otherwise modified), such updates should also be forwarded to the standby BGP process before it is advertised to the network peer devices. This can be accomplished via output RIB hairpinning operations, which are described in more detail in connection with FIGS. 7 and 8.

Figure 7:
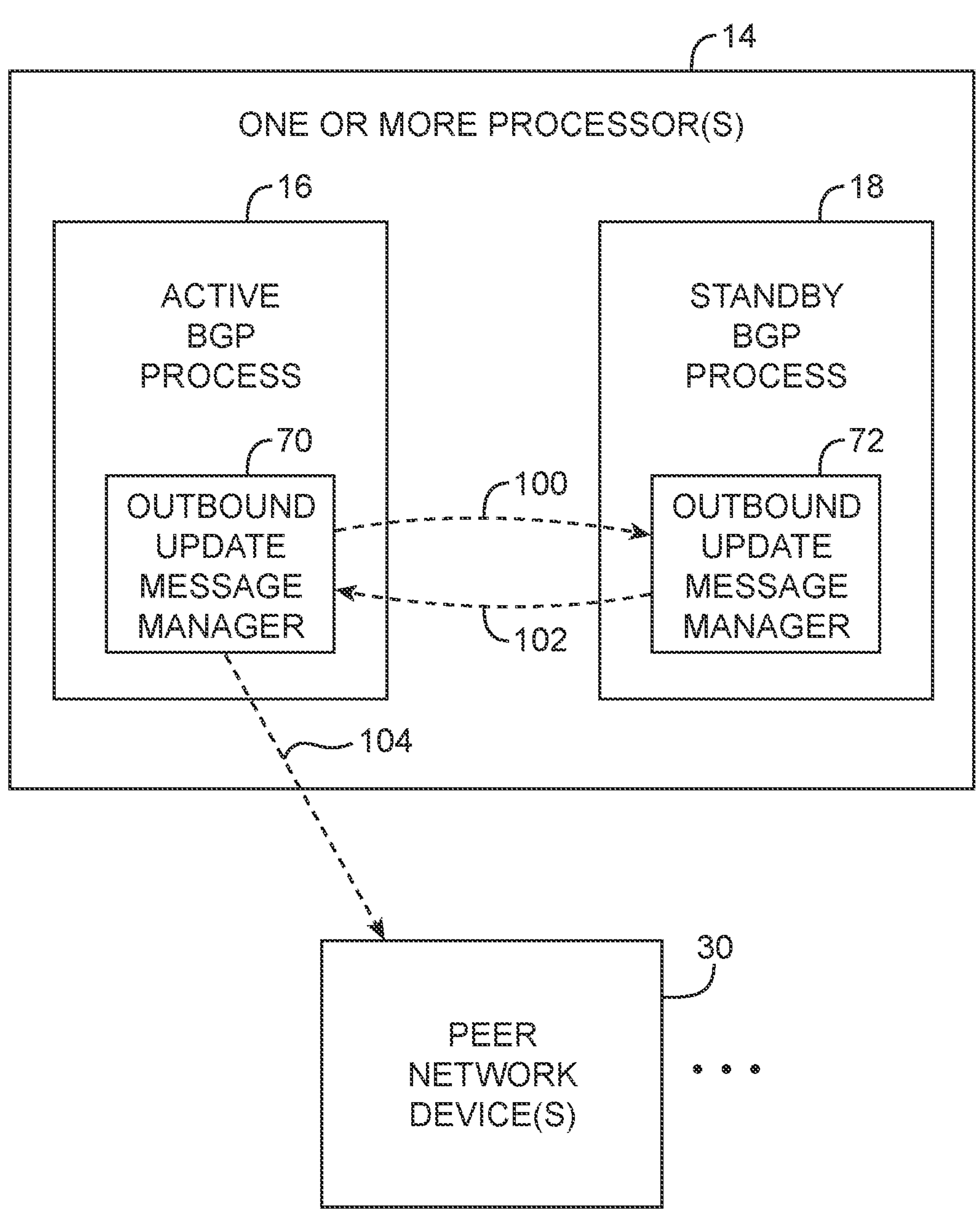
FIG. 7 is a diagram illustrating outbound update message hairpinning between active and standby BGP processes in accordance with some embodiments.

FIG. 7 is a diagram illustrating outbound update message hairpinning between an active BGP process 16 and a standby BGP process. The setup of FIG. 7 is similar to that already described in connection with FIG. 4 and need not be reiterated in detail to avoid obscuring the present embodiment. The outbound hairpinning operation shown in FIG. 7 is best understood in conjunction with the flow chart of FIG. 8. The premise of FIG. 8 assumes that the initial synchronization between an active BGP process and a standby BGP process is complete using the process described in connection with FIG. 6 and that the active BGP process now wants to send one or more new update BGP messages to its peer(s).

During the operations of block 110, outbound update message manager 70 of the active BGP process (sometimes referred to as the active outbound update message manager) can send a BGP update message to the standby BGP process (e.g., to the outbound update message manager 72 of the standby process, which is sometimes referred to as the standby outbound update message manager). This data flow is illustrated by dotted arrow 100 in FIG. 7. If desired, the output state information being sent from the active BGP process to the standby BGP process during block 110 need not be packaged in the form of BGP update messages but can be encoded in other forms of data transport sometimes referred to generally as outbound routing update information.

During the operations of block 112, standby outbound update message manager 72 in the standby BGP process can use the received BGP update messages to update the shadow outbound RIB. During this time, the shadow outbound RIB and optionally the outbound update group in the standby BGP process should be updated in accordance with the newly received BGP update message or the outbound routing update information newly received from the active BGP process. As described above in connection with the operations of FIG. 6, any potential differences between the shadow outbound RIB and the local outbound RIB at the standby BGP process can later be reconciled when the BGP switchover eventually occurs.

During the operations of block 114, the standby outbound update message manager in standby BGP process 18 can send (return) any received BGP update messages or outbound routing update information back to the active outbound update message manager 70. This data flow is illustrated by dotted arrow 102 in FIG. 7.

During the operations of block 116, the active BGP process or more specifically the outbound update message manager 70 can then demultiplex the returning messages (information) received from the standby BGP process and then write those messages to its current peers via respective TCP sessions, as shown by dotted arrow 104 in FIG. 7. Such data flow in which the outbound routing update information is first transmitted from active BGP process 16 to standby BGP process 18 (see data flow 100), looped from standby BGP process 18 back to active BGP process 16 (see data flow 102), and then output to the real peer devices (see data flow 104) is sometimes referred to and defined herein as outbound update message hairpinning operations, outbound update hairpinning operations, or outbound RIB hairpinning operations. The hairpinned traffic can be communicated via a TCP session or other types of channel linking the active and standby BGP processes. Operated in this way, outbound routing information can be properly synchronized between the active and standby BGP processes when the active BGP process wants to send update messages to its peers while the standby BGP process is live or ready. This hairpinning operation therefore allows the standby BGP process to see all outbound routing information associated with a given peer before the peer actually receives that information.

Figure 8:
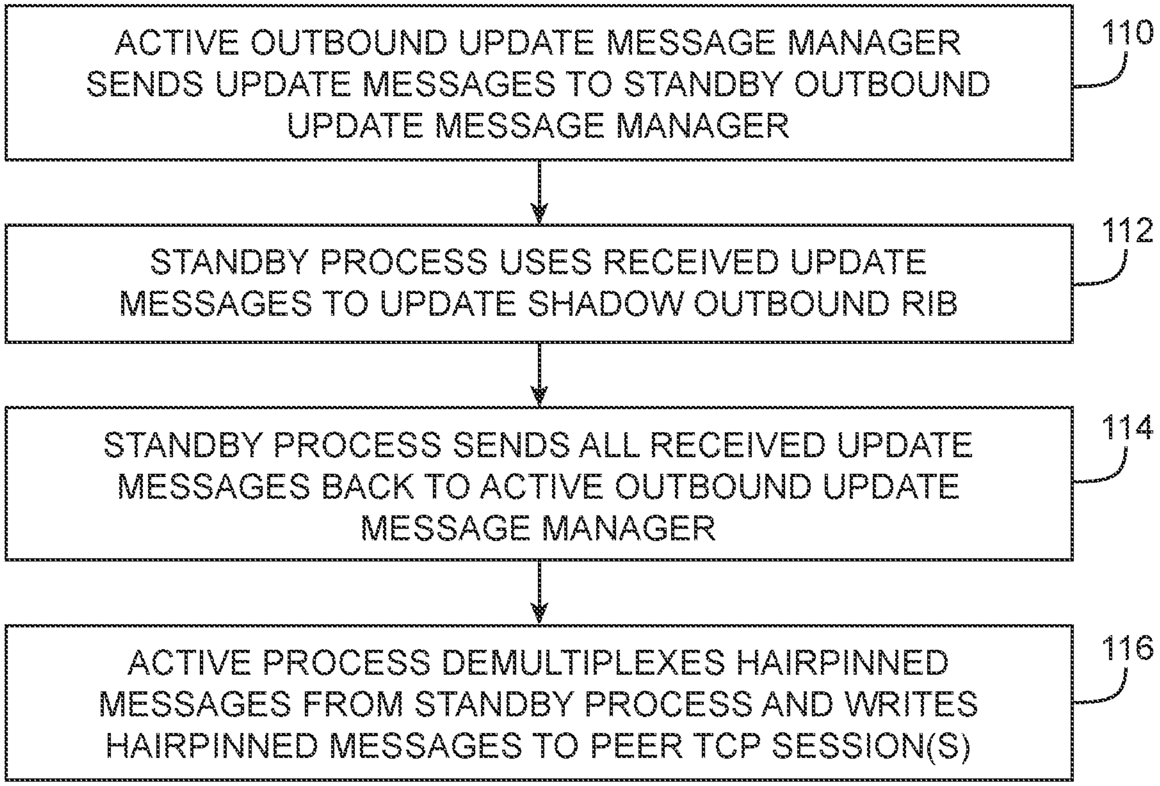
FIG. 8 is a flow chart of illustrative steps for performing outbound update message hairpinning operations in accordance with some embodiments.

The example of FIG. 8 illustrates the hairpinning of BGP update messages. This is merely illustrative. In general, any BGP message transmitted from an active BGP process to a connected peer device can be hairpinned with an associated standby BGP process. As other examples, BGP messages such as keepalive messages, refresh messages, notification messages, or other types of messages can also be hairpinned in the way described in connection with FIGS. 7 and 8.

The methods and operations described above in connection with FIGS. 1-8 may be performed by the components of one or more network device(s) using software, firmware, and/or hardware (e.g., dedicated circuitry or hardware). Software code for performing these operations may be stored on non-transitory computer readable storage media (e.g., tangible computer readable storage media) stored on one or more of the components of the network device. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device (e.g., using processing circuitry 14 of FIG. 1).

The foregoing is merely illustrative and various modifications can be made to the described embodiments. The foregoing embodiments may be implemented individually or in any combination.

What is claimed is:

1. A method for operating an active Border Gateway Protocol (BGP) process running on one or more processors, the method comprising:

establishing a communication session with a peer device;

with an outbound update message manager in the active BGP process, adding the peer device to an outbound update group listing one or more peers sharing a common outbound policy;

with the outbound update message manager in the active BGP process, advertising a collection of routes to at least the peer device;

in response to receiving a synchronization request from a standby Border Gateway Protocol (BGP) process, adding a dummy peer device corresponding to the peer device to the outbound update group; and synchronizing the standby BGP process with the active BGP process by sending, using update generation logic associated with the active BGP process, the collection of routes from the outbound update message manager in the active BGP process to the standby BGP process in accordance with the dummy peer device being listed in the outbound update group.

2. The method of claim 1, wherein establishing the communication session with the peer device comprises establishing a Transmission Control Protocol (TCP) session with the peer device.

3. The method of claim 1, wherein advertising the collection of routes comprises sending a Border Gateway Protocol (BGP) update message to at least the peer device.

4. The method of claim 1, further comprising:

removing the dummy peer device from the outbound update group.

5. The method of claim 1, further comprising:

performing outbound hairpinning operations with the standby BGP process.

6. The method of claim 5, wherein performing the outbound hairpinning operations comprises:

transmitting a BGP message to the standby BGP process;

subsequent to transmitting the BGP message to the standby BGP process, receiving the BGP message from the standby BGP process; and subsequent to receiving the BGP message from the standby BGP process, advertising the received BGP message to the peer device.

7. The method of claim 6, wherein the BGP message comprises a message selected from the group consisting of: an update message, a keepalive message, a refresh message, and a notification message.

8. A method of operating an active Border Gateway Protocol (BGP) process running on one or more processors, the method comprising:

establishing a communication session with a peer device;

adding the peer device to an outbound update group listing one or more peers sharing a common outbound policy;

advertising a collection of routes to at least the peer device;

performing initial synchronization operations with a standby Border Gateway Protocol (BGP) process by adding a shadow peer device corresponding to the peer device to the outbound update group, and sending, with update logic, the collection of routes to the standby BGP process in accordance with the shadow peer device being listed in the outbound update group;

after the initial synchronization operations are complete, sending a Border Gateway Protocol (BGP) message to the standby BGP process; and receiving the BGP message from the standby BGP process.

9. The method of claim 8, further comprising:

sending the received BGP message to the peer device.

10. The method of claim 8, further comprising:

after the standby BGP process starts, receiving a synchronization request from the standby BGP process that triggers the initial synchronization operations.

11. The method of claim 8, wherein performing the initial synchronization operations further comprises:

deleting the shadow peer device from the outbound update group.

12. A system comprising:

an active Border Gateway Protocol (BGP) process executed on one or more processors;

a standby Border Gateway Protocol (BGP) process executed on one or more processors; and a Border Gateway Protocol (BGP) peer configured to communicate with the active BGP process via a Transmission Control Protocol (TCP) session, wherein the active BGP process is configured to add the BGP peer to an outbound update group listing one or more peers sharing a same outbound policy, and add a synchronization peer corresponding to the BGP peer to the outbound update group, wherein the active BGP process is configured to leverage update generation logic associated with the active BGP process to send outbound state information in the form of one or more Border Gateway Protocol (BGP) update messages to the standby BGP process in accordance with the synchronization peer being listed in the outbound update group.

13. The system of claim 12, wherein:

the active BGP process is configured to send a Border Gateway Protocol (BGP) message to the standby BGP process;

the standby BGP process is configured to send the BGP message back to the active BGP process; and the active BGP process is configured to send the BGP message to the BGP peer in response to receiving the BGP message from the standby BGP process.

* * * * *